United States Patent
Smith et al.

(10) Patent No.: US 11,115,873 B1
(45) Date of Patent: Sep. 7, 2021

(54) DYNAMIC POLICY EXCHANGE

(71) Applicant: Cisco Technology, Inc., San Jose, CA (US)

(72) Inventors: Malcolm M. Smith, Richardson, TX (US); Jerome Henry, Pittsboro, NC (US); Sudhir K. Jain, Fremont, CA (US); Srinath Gundavelli, San Jose, CA (US); Shree N. Murthy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/809,408

(22) Filed: Mar. 4, 2020

(51) Int. Cl.
| | |
|---|---|
| *H04W 28/24* | (2009.01) |
| *H04W 12/08* | (2021.01) |
| *H04W 16/18* | (2009.01) |
| *H04W 28/02* | (2009.01) |
| *H04W 88/08* | (2009.01) |

(52) U.S. Cl.
CPC .......... *H04W 28/24* (2013.01); *H04W 12/08* (2013.01); *H04W 16/18* (2013.01); *H04W 28/0268* (2013.01); *H04W 88/08* (2013.01)

(58) Field of Classification Search
CPC . H04W 28/24; H04W 12/08; H04W 28/0268; H04W 88/08; H04W 24/00; H04W 16/18; H04B 17/00; H04B 3/46; H04L 43/00; H04L 43/50

See application file for complete search history.

(56) References Cited

U.S. PATENT DOCUMENTS

| | | |
|---|---|---|
| 6,640,248 B1 | 10/2003 | Jorgensen |
| 6,970,422 B1 | 11/2005 | Ho et al. |
| 7,039,032 B1 | 5/2006 | Ho et al. |
| 7,450,504 B1 | 11/2008 | Ho et al. |
| 7,646,756 B1 | 1/2010 | Ho et al. |
| 7,830,804 B2 | 11/2010 | Kavanaugh et al. |
| 8,009,649 B1 | 8/2011 | Ho et al. |

(Continued)

OTHER PUBLICATIONS

Shin, Jitae, Jong Won Kim, and C-CJ Kuo. "Quality-of-service mapping mechanism for packet video in differentiated services network." IEEE Transactions on Multimedia 3.2 (2001): 219-231. (Year: 2001).*

(Continued)

*Primary Examiner* — Sharad Rampuria
(74) *Attorney, Agent, or Firm* — Patterson + Sheridan, LLP (57) ABSTRACT

Dynamic policy mapping is provided via mapping, by an Access Point (AP), a plurality of applications to a set of privilege groups for Quality of Service (QoS) levels in a network; transmitting the mapping of the privilege groups to a client device; receiving packets from the client device including QoS markers; and in response to determining that the QoS markers received from the client device do not match the privilege groups for the packets, performing a corrective action on the client device, wherein the corrective action includes one or more of: disassociating the client device from the network; and retransmitting the set of privilege groups to the client device. In some embodiments, the privilege groups are transmitted before the client device is associated with the AP, enabling the client device to select what AP to associate with based on the privilege groups.

19 Claims, 6 Drawing Sheets

(56) References Cited

U.S. PATENT DOCUMENTS

| | | | |
|---|---|---|---|
| 8,954,109 B2* | 2/2015 | Aboul-Magd | H04L 65/1069 |
| | | | 455/527 |
| 9,686,720 B2 | 6/2017 | Ho et al. | |
| 2008/0181116 A1 | 7/2008 | Kavanaugh et al. | |
| 2010/0085933 A1 | 4/2010 | Ho et al. | |
| 2011/0310732 A1 | 12/2011 | Ho | |
| 2014/0254502 A1 | 9/2014 | Cai et al. | |
| 2015/0195747 A1 | 7/2015 | Ho et al. | |

OTHER PUBLICATIONS

Agsa Malik, Junaid Qadir, Bashart Ahmad, Kok-Lim Alvin Yau, Ubaid Ullah, "QOS in IEEE 802.11 Based Wireless Networks: A Contemporary Survey," http://arxiv.org/, Nov. 11, 2014, pp. 1-25.

Chen Zhikui et al, "A strategy for differentiated access service selection based on application in WLANs," 2014 IEEE Confrence on Computer Communications Workshops, pp. 317-322, dated Apr. 27, 2014.

PCT, Notification of Transmittal of The International Search Report and The Written Opinion of The International Searching Authority, or The Declaration for Application PCT/US2021/070228 dated Jun. 4, 2021.

* cited by examiner

DYNAMIC POLICY EXCHANGE

TECHNICAL FIELD

Embodiments presented in this disclosure generally relate to distributing and enforcing Quality of Service (QoS) schemes in wireless networks. More specifically, embodiments disclosed herein provide client devices with the ability to choose between different connections based on the current QoS policies before establishing a connection to a network, and to update policies while remaining connected to that network.

BACKGROUND

Various wireless networking standards allow for devices to classify various types of traffic according to different QoS markers that indicate how the traffic should be prioritized (e.g., higher priorities for latency-sensitive traffic versus latency-insensitive traffic, higher priorities for recognized users versus guest users, higher priorities for retry traffic versus first attempt transmissions, etc.). Various network controllers can specify different QoS schemes that set different priorities for traffic indicated with one or more QoS markers, but client devices can misapply QoS markers, either intentionally to up-prioritize traffic that should be a lower priority, or unintentionally if using an outdated scheme assignment for traffic, for example.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes: receiving, at a client device, a first privilege group mapping from a first Access Point (AP) that identifies first privilege levels for one or more applications executing on the client device; receiving, at the client device, a second privilege group mapping from a second AP that identifies second privilege levels for the one or more applications; selecting between the first AP and the second AP based on which of the first privilege group mapping and the second privilege group mapping better satisfies requirements of the one or more applications; establishing a connection with the selected AP; and applying Quality of Service (QoS) markers to traffic transmitted from the client device to the selected AP based on the privilege group mapping corresponding to the selected AP.

One embodiment presented in this disclosure is a method that includes: mapping, by an Access Point (AP), a plurality of applications to a set of privilege groups for Quality of Service (QoS) levels in a network; transmitting the mapping of the privilege groups to a client device; receiving packets from the client device including QoS markers; and in response to determining that the QoS markers received from the client device do not match the privilege groups for the packets, performing a corrective action on the client device.

One embodiment presented in this disclosure is a computer readable storage device including instructions that when executed by a processor perform an operation that includes: mapping, by an Access Point (AP), a plurality of applications to a set of privilege groups for Quality of Service (QoS) levels in a network; transmitting the mapping of the privilege groups to a client device; receiving packets from the client device including QoS markers; and in response to determining that the QoS markers received from the client device do not match the privilege groups for the packets, disassociating the client device from the network.

Example Embodiments

Embodiments of the present disclosure provide for the distribution and enforcement of Quality of Service (QoS) schemes in wireless networks which leverage Application Identifiers (AppIDs) to assign different priority levels of service according to network conditions and network policies. An Access Point (AP) indicates to various client devices the privilege levels assigned to different applications (or data streams within an application) during negotiation with the client devices so that the client devices may select to connect to the AP or to a different AP that provides a desired QoS for one or more designated applications. The privilege levels assigned for various applications can include various priority levels (e.g., first priority, second priority, best effort, guaranteed minimum rates, etc.) as well as denials of service (e.g., blacklisted/blocked, throttled rates, etc.). In some embodiments, the AP changes the privilege levels assigned to different applications based on current networking conditions (and may negotiate with various client devices to set those privilege levels) and monitor communications from connected client devices to ensure that the associated client devices conform to the QoS scheme and properly mark traffic according to the scheme.

Figure 1:
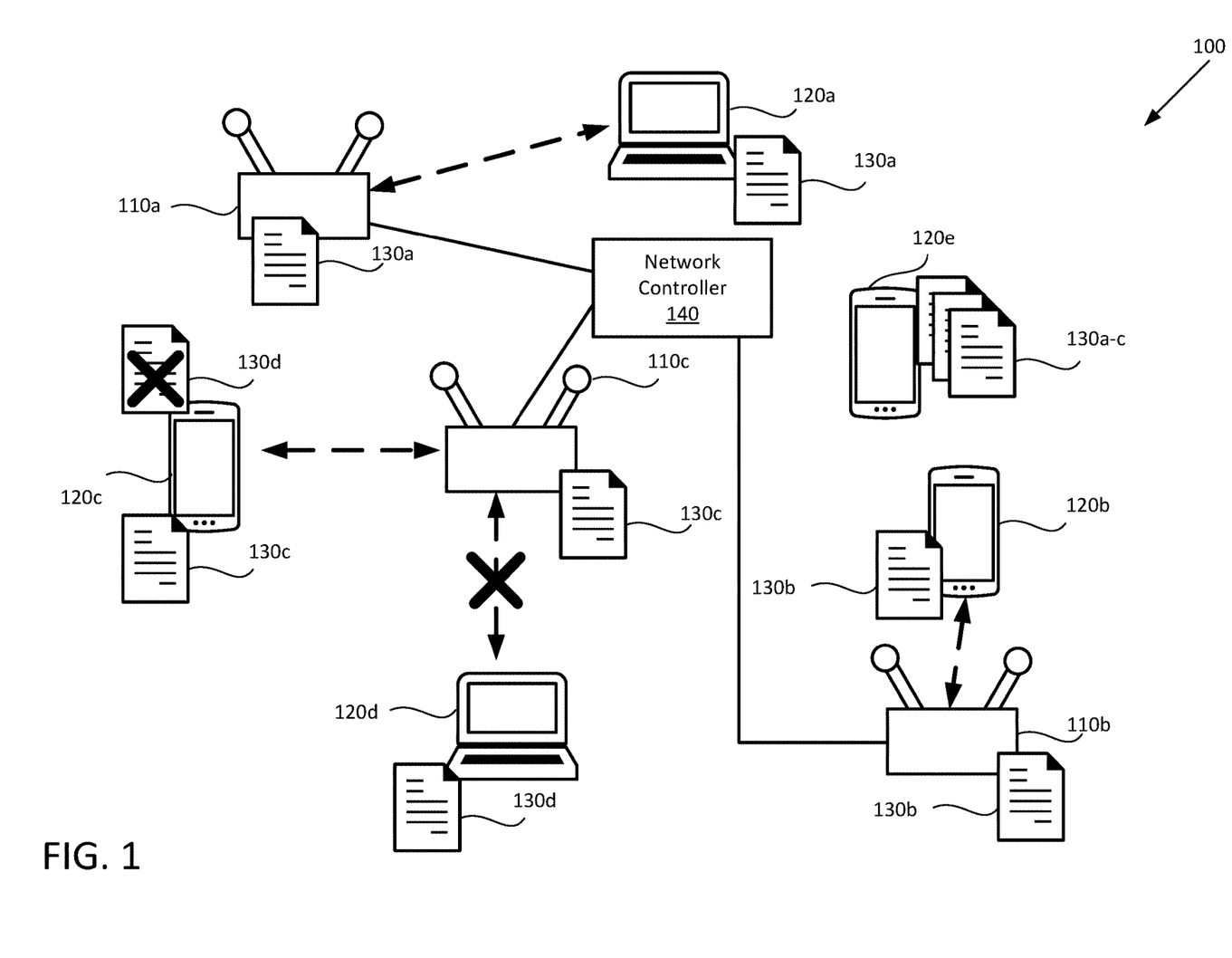
FIG. 1 illustrates a network environment, according to embodiments of the present disclosure.

FIG. 1 illustrates a network environment 100, according to embodiments of the present disclosure. As illustrated in FIG. 1, a plurality of APs 110a-c (generally, AP 110) serve various client devices 120a-e (generally, client device 120) in the environment 100. Each of the APs 110a-c offer privilege group mappings 130a-c (generally, privilege group mapping) for how a given AP 110 handles traffic with the associated client devices 120, and several APs 110 in the same network may offer the same or different privilege levels to various applications, devices, users, and packet types according to the privilege group mappings. In various embodiments, a network controller 140, which may be implemented in a separate computing device or in one of the APs 110, coordinates the operation of the APs 110 in a shared network.

For example, a first client device 120a may be associated with a first AP 110a and send communications to and receive communications from the first AP 110a that indicate a QoS marker conforming to a first privilege group mapping 130a. In another example, a second AP 110b may mandate that a second client device 120b associated with the second AP 110b mark transmissions according to a second privilege group mapping 130b that specifies different priority levels than the first privilege group mapping 130a, even if the first AP 110a and the second AP 110b are part of the same network. The privilege group mappings 130 can indicate groups of AppIDs that are blocked or otherwise not served by the network as wells as groups of AppIDs that are served at various priority levels by the network. In various embodiments, individual APs 110 may set how various applications are prioritized based on local conditions including, but not limited to: a number of client devices 120 associated with the given AP 110, an amount of traffic sent to/from the AP 110, user accounts of the associated client devices 120, a signal to noise ratio (SNR) in the service range of the given AP 110, a packet loss rate, etc.

In a further example, a third AP 110c associated with a third client device 120c and a fourth client device 120d may mandate that traffic conform to a third privilege group mapping 130c, which replaces an earlier-provided, fourth privilege group mapping 130d. In the present example, the third client device 120c receives the third privilege group mapping 130c and configures traffic according to the new, third privilege group mapping 130c. In various embodiments, the third client device 120c deletes or overwrites the fourth privilege group mapping 130d. In the present example, the fourth client device 120d continues using the fourth privilege group mapping 130d, even though the third AP 110c mandates the use of the third privilege group mapping 130c, and in response, the third AP 110c disassociates the fourth client device 140d; breaking the connection therebetween. In some embodiments, the third AP 110c may attempt to resend the newer third privilege group mapping 130c one or more times to the fourth client device 120d before disassociating the fourth client device 120d. In some embodiments, disassociating the fourth client device 120d from the third AP 110c allows the fourth client device 120d to re-associate with the third AP 110c and receive the third privilege group mapping 130c for proper use after re-association as part of the association process.

In some embodiments, after one or more re-association attempts and a continued insistence of the fourth client device 120d to classify traffic using a scheme other than the third privilege group mapping 130c mandated by the third AP 110c, the third AP 110c may blacklist (locally or across the network) (i) the fourth client device 120d, (ii) an account associated with the fourth client device 120d, or (iii) an application running on the fourth client device 120d whose traffic does not comply with the third privilege group mapping 130c. Stated differently, the third AP 110c can refuse to associate with the fourth client device 120d when the fourth client device 120d refuses to classify traffic according to the third privilege group mapping 130c. The APs 110 may manage blacklists for devices, users, or applications that do not classify traffic according to the mandated privilege group mappings 130 to prevent malicious or selfish use of network resources.

In a further example, a fifth client device 120e, with is not yet associated with any of the APs 110a-c in the environment 100 may receive the currently mandated privilege group mappings 130a-c to determine which AP 110 to associate with (e.g., via 802.11u exchange procedures). For example, the fifth client device 120e may receive the privilege group mappings 130 via GAS-221 (Generic Advertisement Service) queries and responses that do not require active associations/connections between the APs 110 and the fifth client device 120e. Accordingly, the fifth client device 120e may analyze the several privilege group mappings 130a-c to determine how to receive the highest QoS based on the priorities of the user of the fifth client device 120e. Once the fifth client device 120e determines which of the APs 110a-c to associate with based on the respective privilege group mappings 130a-c, the fifth client device 120e may begin association procedure with the selected AP 110 and delete/discard the privilege group mappings 130 for the non-associated-with APs 110.

In some embodiments, a client device 120 evaluates several APs 110 based on the priority levels assigned to various traffic types in the corresponding privilege group mappings 130 and associates with the given AP 110 that provides privilege levels most closely matching the communications priorities of the client device 120. For example, if the client device 120 is seeking to prioritize communications made to/from application A, the client device 120 may select the AP 110 whose privilege group mapping 130 gives application A the highest priority among the received privilege group mappings 130. In a further example, if the client device 120 is seeking to use application B, but does not prioritize communications to/from application B over other applications running on the client device 120, the client device 120 may select any AP 110 that does not blacklist or otherwise block/drop communication to/from application B.

In some embodiments, the client device 120 uses the privilege group mappings 130 to configure (or reconfigure) how traffic is formed so that the client device 120 receives a higher QoS for traffic according to the privilege group mapping of the selected AP 110. Consider, for example, a video conferencing application that may include a video stream, an audio stream, and a text stream (e.g., for instant messaging between participants in a video conference). A privilege group mapping 130 may assign the different streams different privilege and/or priority levels if the streams are identified (e.g., to provide audio with greater latency resiliency than video, which is provided greater latency resiliency than text), but assign data/to from the video conferencing application with the lowest privilege level if the streams are not identified (e.g., treat all the data as belonging to the text stream unless identified). Accordingly, the client device 120 can configure the traffic to identify different streams with different QoS markers to receiver a higher overall QoS according to the privilege group mapping 130.

An AP 110 may include various networking devices configured to provide wireless networks according to various networking standards or Radio Access Technologies (RAT) (e.g., IEEE 802.11 or "WiFi" networks, BLUETOOTH® networks, "cellular" (including various generations and subtypes thereof, such as Long Term Evolution (LTE) and Fifth Generation New Radio (5G NR)) networks, Citizens Broadband Radio Service (CBRS) networks, proprietary networks). Example hardware as may be included in an AP 110 is discussed in greater detail in regard to FIG. 5.

Similarly, a client device 120 may include any computing device that is configured to wirelessly connect to one or more APs 110. Example client devices 120 can include, but are not limited to: smart phones, feature phones, tablet computers, laptop computers, desktop computers, Internet of Things (IoT) devices, and the like. Example hardware as may be included in a client device 120 is discussed in greater detail in regard to FIG. 5.

Figure 2:
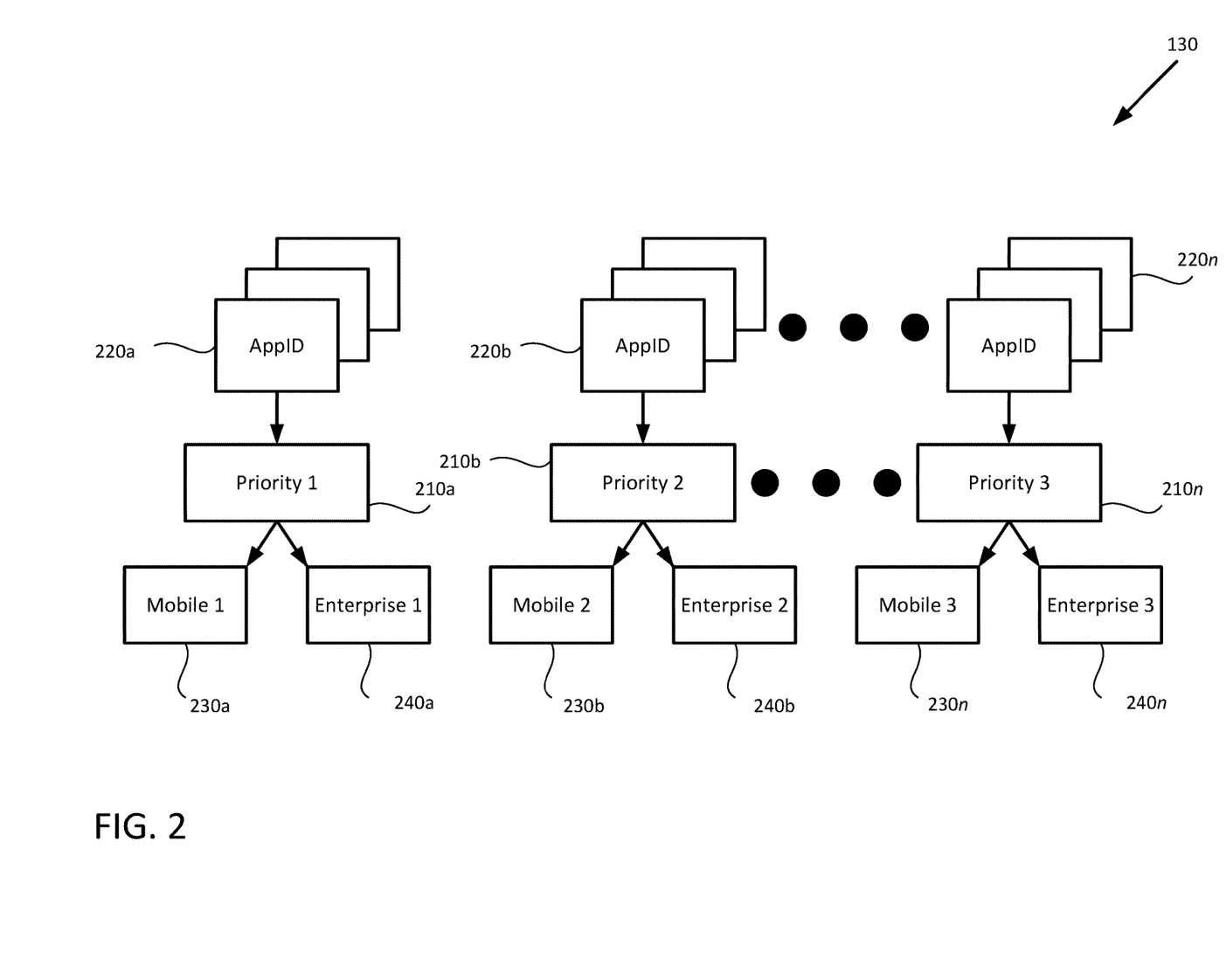
FIG. 2 illustrates a privilege group mapping, according to embodiments of the present disclosure.

FIG. 2 illustrates a privilege group mapping 130, according to embodiments of the present disclosure. The privilege group mapping 130 assigns various priority levels 210 for various applications based on the AppIDs 220 of those application. Several such applications can thus be grouped for various priority levels 210. Accordingly, a privilege group mapping 130 defines how a set of privilege groups are allocated amongst the various applications requesting network resources (e.g., bandwidth) on a network.

As illustrated, a first set of AppIDs 220*a* are grouped for a first priority level 210*a* (e.g., privileged applications), a second set of AppIDs 220*b* are grouped for a second priority level 210*b* (e.g., regular applications), and an nth set of AppIDs 220*n* are grouped for an nth priority level 210*n* (e.g., blacklisted applications). Various other categories can be provided for grouping AppIDs 220 into sets with corresponding priority levels 210 (e.g., reduced bandwidth applications, Time-of-Day-controlled applications, backup applications, etc.) that can vary as network conditions change. For example, a first application may have an associated AppID 220 associated with a first priority level at a first time and a second priority level at a second time due to increase/decreases in available bandwidth, the presence/absence of a higher-priority application communicating on the network, the presence/absence of a higher-priority client device 120 associated with the AP 110, etc.

The priority levels 210 can be described via mobile-provided QoS level descriptors 230 and enterprise-provided QoS level descriptors 240 for how the client device 120 and the AP 110 respectively handle and prioritize the traffic. For example, a client device 120 can create, customize or adjust a mobile-provided QoS level descriptor 230 for an application described by the client device 120 via various key performance indicators (e.g., data rate, delay/jitter bounds, application class, DSCP or TOS marking, etc.) to provide communications for the corresponding application at a known QoS level (e.g., at a guaranteed bit rate). In a further example, a network controller 140 can specify an enterprise-provided QoS level descriptor 240 at which the AP 110 handles traffic for a given application, which may be unknown to the client device 120. The enterprise-provided QoS level 240 can be defined based on various key performance indicators (e.g., priority, delay/jitter bounds, application class, etc.) and instruct the client device 120 to map differentiated services code point (DSCP) values to traffic identifiers (TID) or User Priority (UP) per application to identify how the AP 110 is to handle the traffic.

Although FIG. 2 illustrates the mobile QoS level descriptors 230 and enterprise QoS level descriptors 240 separately, a given AppID 220 can be described by one of the mobile QoS level descriptors 230 and the QoS level descriptors 240 or both of the mobile QoS level descriptors 230 and the QoS level descriptors 240.

In various embodiments, the QoS level descriptors 230/240 can specify different privileges for different flows of content (also referred to as a data streams) from a single application. For example, a video conferencing application may provide different levels of service for the audio, video, and content (e.g., text, metadata, slides/images) related to a presentation so that the most latency-sensitive data are provided a higher priority than less sensitive data.

In various embodiments, when a client device 120 initiates communications with an application that is not currently assigned to a priority level 210, the client device 120 may negotiate which priority level 210 that the application should be assigned to. The client device 120 reports the expected needs of the application under negotiation, including various key performance indicators, such as, delay, jitter, application type (e.g., enterprise, gaming, productivity, general purpose), relative priority assessment to other applications running on the client device 120, etc. In some embodiments, the key performance indicators include prior socket readings of the activity level of the application, thus including a flow descriptor, minimum and peak data rate values, delay bound information, and jitter bound information (e.g., via TSPEC (Traffic Specification) reporting).

Figure 3A:
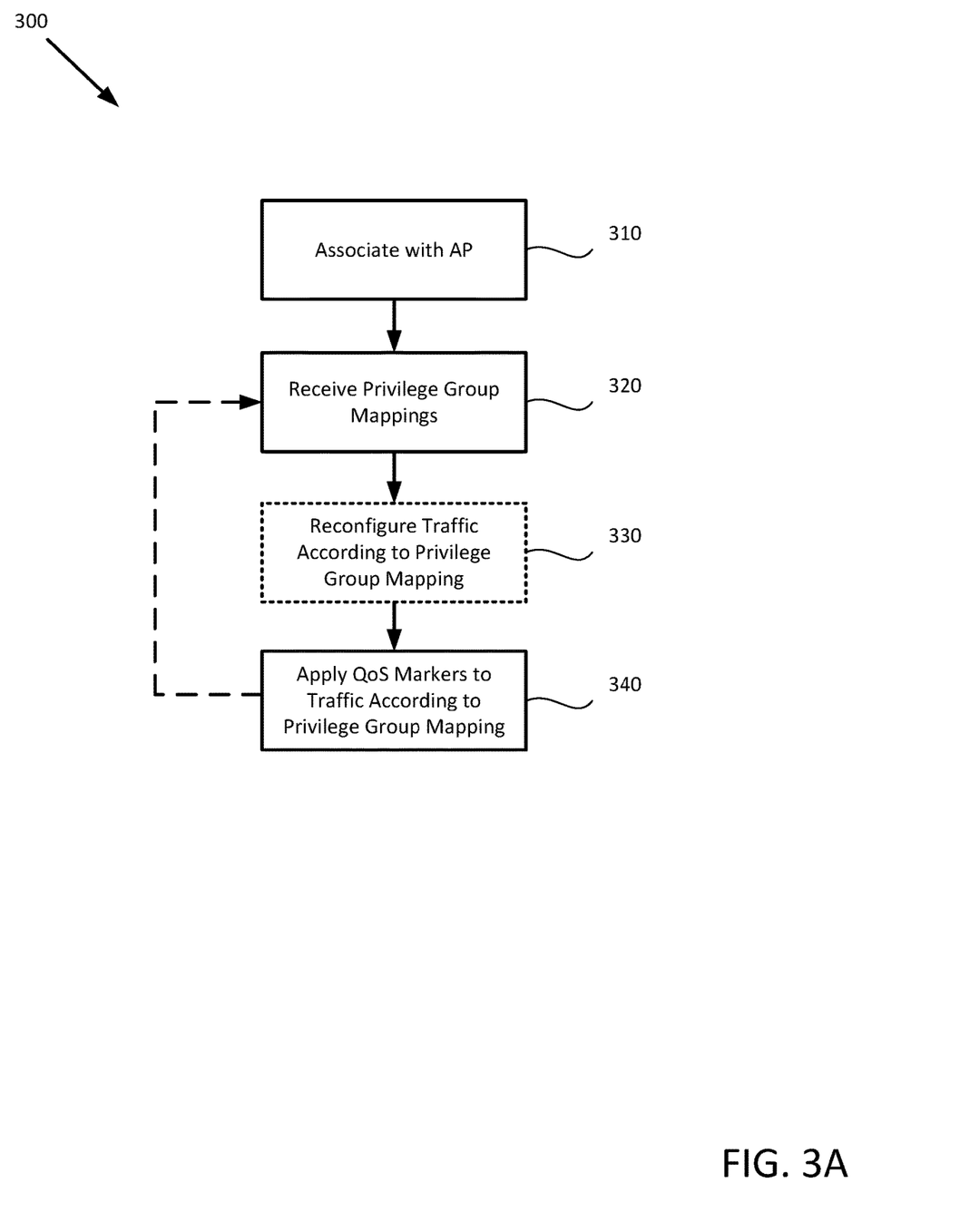
FIGS. 3A and 3B are flowcharts of methods from the perspectives of client devices, according to embodiments of the present disclosure.

FIG. 3A is a flowchart of a method 300 from the perspective of a client device 120 that associates with an AP 110 before receiving a privilege group mapping 130, according to embodiments of the present disclosure. Method 300 begins at block 310, where the client device 120 associates with the AP 110 to establish a communications session according to a wireless communications standard (e.g., a WiFi, Bluetooth, LTE, 5G, or other communication protocol). The client device 120 and the AP 110 may establish an association/connection via a various handshake procedures and exchange encryption keys to begin transmitting data between one another once block 310 is complete.

At block 320, the client device 120 receives a privilege group mapping 130 from the AP 110 associated with in block 310. In various embodiments, the client device 120 may initiate transfer of the privilege group mapping 130 via an Access Network Query Protocol (ANQP) GAS request that identifies the applications running on the client device 120, and the AP 110 returns in an initial response (or in one or more comeback responses) the privilege levels associated with the identified applications. In some embodiments, the client device 120 may receive a full privilege group mapping 130 (identifying the priority levels 210 associated with all of the AppIDs 220 currently mapped in the network), while in other embodiments, the client device 120 may receive a partial privilege group mapping 130 (identifying the priority levels 210 for the identified AppIDs 220 in the query).

At block 330, the client device 120 optionally reconfigures traffic according to the privilege group mapping 130 for the associated AP 110 to increase the QoS level available to the client device 120. For example, a client device may initially configure traffic from a given application according to a first format that the privilege group mapping 130 gives a first QoS level, but the privilege group mapping 130 also offers a second QoS level for a second format of traffic. Accordingly, the client device may reconfigure the traffic from the first format to the second format (e.g., by separately formatting different data flows, by requesting a different encapsulation or datagram format) to take advantage of the second QoS level if the second QoS level offers a preferred priority level for the traffic.

At block 340, the client device 120 applies QoS markers to uplink traffic to the AP 110 that the client device is associated with according to the privilege group mapping 130 for that AP 110. In various embodiments, the QoS markers are added to packets/frames transmitted from the client device to the AP 110 according to the application or particular data format (e.g., in different flows from one application) sending or requesting data. In various embodiments, the applications may apply one or more QoS markers or AppIDs to the traffic, and an Operating System or messaging controller on the client device 120 replaces original QoS markers applied by the application with the QoS markers based on the privilege group mapping 130 supplied from the AP 110.

In various embodiments, method 300 may repeat from block 320 so that the client device 120 can receive updated versions of the privilege group mapping 130 after an earlier privilege group mapping 130 is received while remaining associated with the current AP 110. In various embodiments, the updated versions of the privilege group mapping 130 can be a complete re-mapping of privilege levels for different applications, or can be a partial re-mapping that identifies changes in privilege level assignments and/or privilege level assignments for newly identified applications relative to an earlier version of the privilege group mapping 130. Additionally, as discussed in greater detail in regard to FIG. 3B, the client device 120 may request and/or receive privilege group mappings 130 from other APs 110 to determine whether to request a handoff to a different AP 110 based on the privileges assigned in the respective privilege group mappings 130.

Figure 3B:
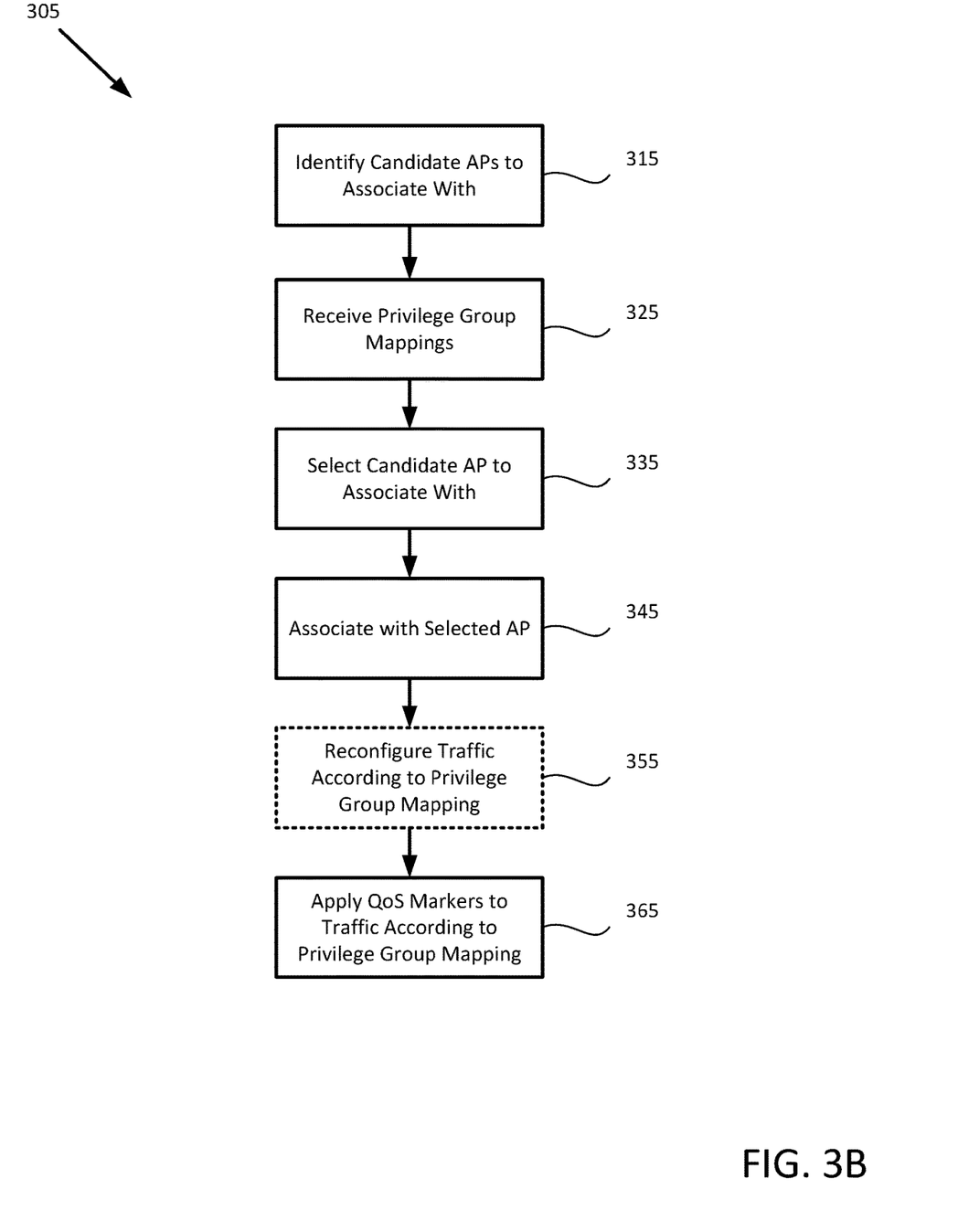

FIG. 3B is a flowchart of a method 305 from the perspective of a client device that associates with an AP 110 after receiving a privilege group mapping 130, according to embodiments of the present disclosure. In various embodiments, method 305 may be performed by a client device 120 that is not associated with any AP 110, or is currently associated with a given AP 110, but is evaluating whether to associate with a different AP 110. Method 305 begins at block 315, where the client device 120 identifies one or more candidate AP 110 to associate with. These candidate APs 110 can include any of the APs 110 within the range of the client device 120, or a selected subset of the APs 110 within the range of the client device 120 (e.g., those APs 110 belonging to network A but not those APs 110 belonging to network B, those APs 110 offering a given signal strength, those APs 110 operating a given communications standard, etc.).

At block 325, the client device 120 receives privilege group mappings 130 from the candidate APs 110 identified in block 315. In various embodiments, the client device 120 may initiate transfer of the privilege group mapping 130 via an Access Network Query Protocol (ANQP) GAS request that identifies the applications running on the client device 120, and the candidate APs 110 return in an initial response (or in one or more comeback responses) the privilege levels associated with the identified applications. In some embodiments, the client device 120 may receive a full privilege group mapping 130 (identifying the priority levels 210 associated with all of the AppIDs 220 currently mapped in the network), while in other embodiments, the client device 120 may receive a partial privilege group mapping 130 (identifying the priority levels 210 for the identified AppIDs 220 in the query). In some embodiments, the client device 120 may also receive privilege group mappings 130 when already associated with a first AP 110a and seeking to handoff to a new AP 110 with a QoS more closely aligned with a desired QoS, or when receiving an updated privilege level mapping from the AP 110.

At block 335, the client device 120 selects which candidate AP 110 to associate with (or remain associated with) based at least in part on the privilege group mappings 130 received in block 325. In various embodiments, the client device 120 identifies the privilege group mapping 130 that provides the best service, per the needs and priorities of the client device 120, and selects the AP 110 that provided that privilege group mapping 130. For example, a first client device 120a executing a video conferencing application may select to associate with a first AP 110a that offers a highest privilege level to the video conferencing application and a second highest privilege level to a gaming application that the first client device 120a is not executing. In contrast, a second client device 120b not executing the video conferencing application and executing the gaming application may select to associate with a second AP 110b that gives the gaming application higher priority than the first AP 110a does. Similarly, a third client device 120c executing both the video conferencing application and the gaming application may select which of the first AP 110a and the second AP 110b in the present example to associate with based on a user-defined priority for the two applications.

When several APs 110 provide the privilege group mappings 130 that all meet or exceed the requirements of the client device 120, the client device 120 may select the "best" privilege group mapping based to prioritize remaining associated with a current AP 110, associating with the AP 110 with the largest range, associating with the AP 110 physically closest to the client device 120, associating with the AP 110 with the strongest signal, associating with the AP 110 with the fewest active connections, etc.

At block 345, the client device 120 associates with the selected AP 110 from block 335 to establish a communications session according to a wireless communications standard (e.g., a WiFi, Bluetooth, LTE, 5G, or other communication protocol). The client device 120 and the AP 110 may establish an association/connection via a various handshake procedures and exchange encryption keys to begin transmitting data between one another once block 345 is complete.

At block 355, the client device 120 optionally reconfigures traffic according to the privilege group mapping 130 for the associated AP 110 to increase the QoS level available to the client device 120. For example, a client device may initially configure traffic from a given application according to a first format that the privilege group mapping 130 gives a first QoS level, but the privilege group mapping 130 also offers a second QoS level for a second format of traffic. Accordingly, the client device may reconfigure the traffic from the first format to the second format (e.g., by separately formatting different data flows, by requesting a different encapsulation or datagram format) to take advantage of the second QoS level if the second QoS level offers a preferred priority level for the traffic.

At block 365, the client device 120 applies QoS markers to uplink traffic to the AP 110 that the client device is associated with according to the privilege group mapping 130 for that AP 110. In various embodiments, the QoS markers are added to packets/frames transmitted from the client device to the AP 110 according to the application or particular data format (e.g., in different flows from one application) sending or requesting data. In various embodiments, the applications may apply one or more QoS markers or AppIDs to the traffic, and an Operating System or messaging controller on the client device 120 replaces original QoS markers applied by the application with the QoS markers based on the privilege group mapping 130 supplied from the AP 110.

In various embodiments, a client device 120 may perform method 300 and/or method 305 in response to the associated-with AP 110 transmitting an updated privilege group mapping 130 to the client device 120. For example, after performing method 300 or method 305, the client device 120 may perform method 300 (starting from block 320) to maintain the connection with the associated AP 110 in response to receiving an updated privilege group mapping 130. In a further example, after performing method 300 or method 305, the client device 120 may perform method 305 to determine whether to associate with a different AP 110 in response to receiving an updated privilege group mapping 130.

In some embodiments, the AP 110 transmits the updated privilege group mapping 130 in response to updating the privilege group mapping 130 (e.g., in response to changing network conditions or after a predetermined amount of time, identifying a new application and mapping a privilege level thereto). In some embodiments, the AP 110 transmits the updated privilege group mapping 130 in response to the client device misclassifying the uplink traffic (e.g., using an out-of-date privilege group mapping 130 or otherwise applying QoS markers that do not conform with the updated privilege group mapping 130). In some embodiments, the client device requests an updated privilege group mapping 130 from the associated AP 110 and/or one or more other APs 110 to reevaluate whether to remain associated with the current AP 110.

Figure 4:
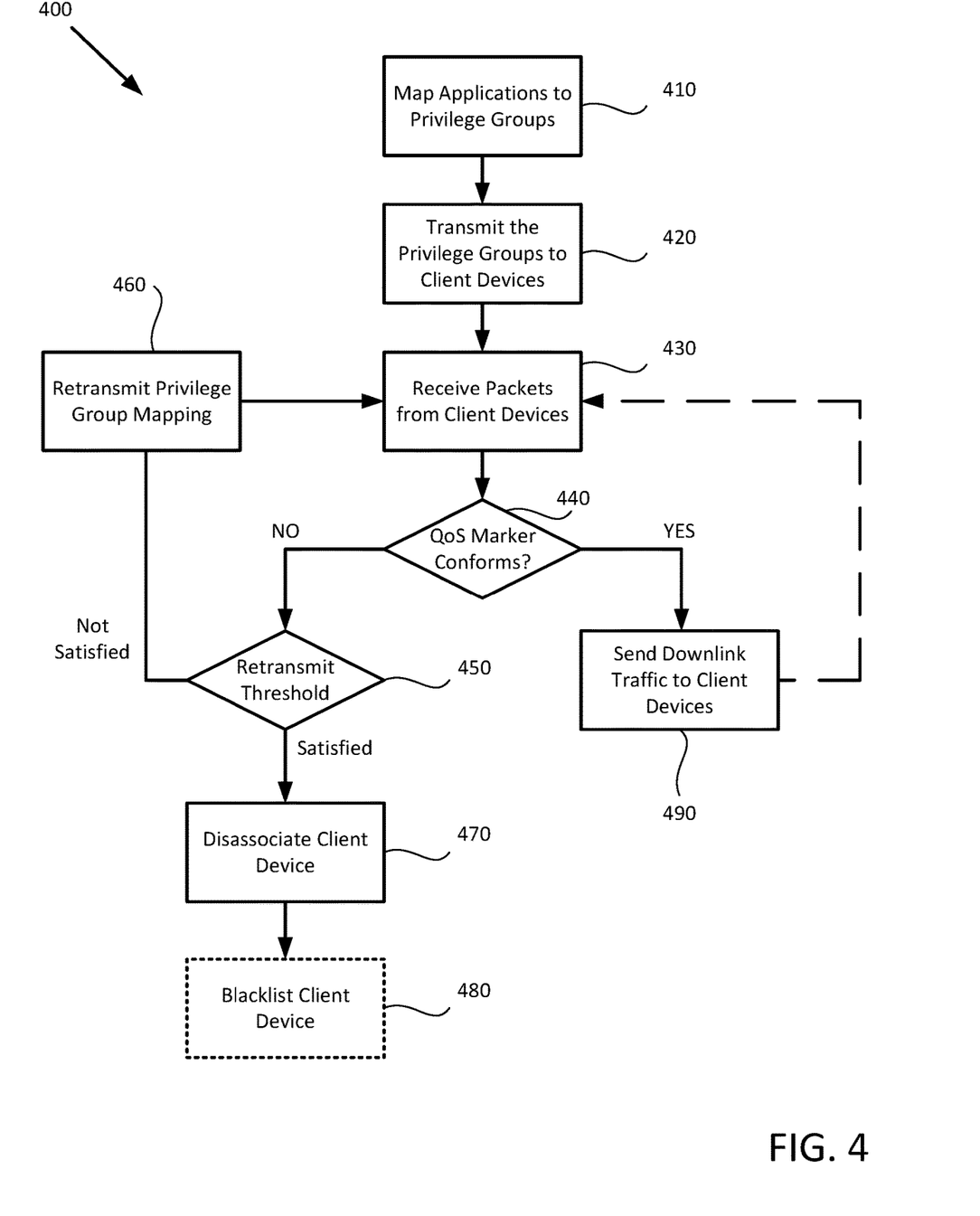
FIG. 4 is a flowchart of a method from the perspective of an Access Point, according to embodiments of the present disclosure.

FIG. 4 is a flowchart of a method 400 from the perspective of an AP 110, according to embodiments of the present disclosure. Method 400 may begin with block 410, where the AP 110 (or a network controller 140) maps applications to various privilege levels for access to network resources, and into groups with shared privilege levels. In various embodiments, the AP 110 determines the privilege levels to assign based on the identity or class of the applications so that similar types of applications receive similar QoS levels. The AP 110 may change the privilege levels assigned to different applications based on current networking conditions including, but not limited to: a number of client devices 120 associated with the given AP 110, an amount of traffic sent to/from the AP 110, user accounts of the associated client devices 120, a SNR in the service range of the given AP 110, a reported packet loss rate, etc. The AP 110 may negotiate with the client devices 120 for what privilege level to assign various applications based on network settings and connectivity requirements of the new application including: delay, jitter, application type (e.g., enterprise, gaming, productivity, general purpose), relative priority assessment to other applications running on the client device 120. In some embodiments, the key performance indicators include prior socket readings of the activity level of the application, thus including a flow descriptor, minimum and peak data rate values, delay bound information, and jitter bound information (e.g., via TSPEC reporting).

At block 420, the AP 110 transmits the privilege group mapping 130 to a client device 120. In various embodiments, the privilege group mapping 130 can be transmitted to the client device 120 before the client device 120 (potentially) associates with the AP 110, during initialization of an association with the client device 120, or after the client device 120 and the AP 110 have established an association. In some embodiments, when the client device 120 and the AP 110 are associated when the AP 110 transmits the privilege group mapping 130, the privilege group mapping 130 may be an updated privilege group mapping 130 that changes one or more privilege levels for one or more applications or adds newly identified applications to one or more privilege levels. In some embodiments, the AP 110 may initiate transfer of the privilege group mapping 130 via an ANQP GAS request that identifies the applications running on the client device 120, and the AP 110 returns in an initial response or in one or more comeback responses the privilege levels associated with the identified applications. In some embodiments, the client device 120 may receive a full privilege group mapping 130 (identifying the priority levels 210 associated with all of the AppIDs 220 currently mapped in the network), while in other embodiments, the client device 120 may receive a partial privilege group mapping 130 (identifying the priority levels 210 for the identified AppIDs 220 in the query).

At block 430, the AP 110 receives packets from associated client devices 120. These packets may include QoS markers for the applications sending the packets to the AP 110. In various embodiments, the Operating System or messaging controller on the client device 120 replaces original QoS markers applied by the application with the QoS markers based on the privilege group mapping 130 supplied from the AP 110.

At block 440, the AP 110 determines whether a given client device is using QoS markers on uplink traffic that conform with the privilege group mapping 130 based on the packets received from the given client device per block 430. The AP 110 may compare the QoS markers and the AppIDs of the requesting applications against the privilege group mapping 130 to determine whether the client device 120 is marking packets transmitted to the AP 110 as prescribed by the privilege group mapping 130. Method 400 proceeds to block 450 to determine which corrective actions to apply when the client device 120 is improperly classifying traffic according to the privilege group mapping 130. Method 400 proceeds to block 490 when the client device 120 properly classifies traffic according to the privilege group mapping 130.

At block 450, the AP 110 determines whether a privilege group mapping retransmit threshold has been reached for the nonconforming client device 120. For example, the AP 110 may attempt to supply an updated privilege group mapping 130 to a client device 120 up to N times within a given time period before disassociating the client device 120. Accordingly, if the AP 110 has retransmitted the privilege group mapping 130 N or more times and the client device 120 continues to use QoS markers that do not conform to the privilege group mapping 130, method 400 proceeds to block 470, where the client device 120 is disassociated from the AP 110. Otherwise, when the retransmit threshold is not satisfied (e.g., retransmissions<N), method 400 proceeds to block 460, where the AP 110 transmits the privilege group mapping 130 to the client device 120.

At block 460, the AP 110 retransmits the privilege group mapping 130 to the client device 120 that is using QoS markers that do not conform with the privilege group mapping 130. For example, the client device 120 may have failed to receive an updated privilege group mapping 130 (e.g., due to packet loss, the client device 120 being in sleep mode, lack of transmission from the AP 110) and continues to use the old privilege group mapping 130 until the updated privilege group mapping 130 is successfully received. After transmitting the privilege group mapping 130 to the client device 120 that is using QoS markers that do not conform with the privilege group mapping 130, method 400 returns to block 430 and block 440 where the AP 110 continues to receive packets from the client device 120 that are monitored to determine if client device 120 is now using the retransmitted privilege group mapping 130.

At block 470, the AP 110 disassociates from a client device 120 that is using QoS markers that do not conform with the privilege group mapping 130. In various embodiments, after disassociating the client device 120, the AP 110 allows the disassociated client device 120 to attempt to re-associate with the AP 110 and to receive the privilege group mapping 130 one or more times. For example, when the client device 120 is not capable of receiving and implementing an updated privilege group mapping 130, the client device 120 may disassociate from the AP 110 and receive the update privilege group mapping 130 at or before re-association, and then properly apply the updated QoS markers.

In some embodiments, once the client device 120 has been disassociated from the AP 110 at least a threshold number of times within a given time period for using QoS markers that do not conform with the privilege group mapping 130, or the behaviors of the client device 120 violate a security policy, or the AP 110 otherwise determine that the client device 120 is behaving maliciously, selfishly, or is incapable of properly applying QoS markers as specified in the privilege group mapping 130, method 400 optionally proceeds from block 470 to block 480. In block 480, the AP 110 blacklists the client device 120 and thereby prevents the client device from re-associating with the AP 110 or another AP 110 in the network for at least a predefined amount of time (e.g., by ignoring or denying association requests).

At block 490, the AP 110 sends queued downlink traffic to the associated client devices according to the QoS level assigned in the privilege group mapping 130. The AP 110 may indicate in the packets transmitted to the client device 120 what the QoS marker for uplink traffic should be by using the equivalent QoS marker in the downlink traffic. Method 400 may then return to block 430 to continue to receive packets from the client devices 120 that mark uplink traffic according to the privilege group mapping 130.

Figure 5:
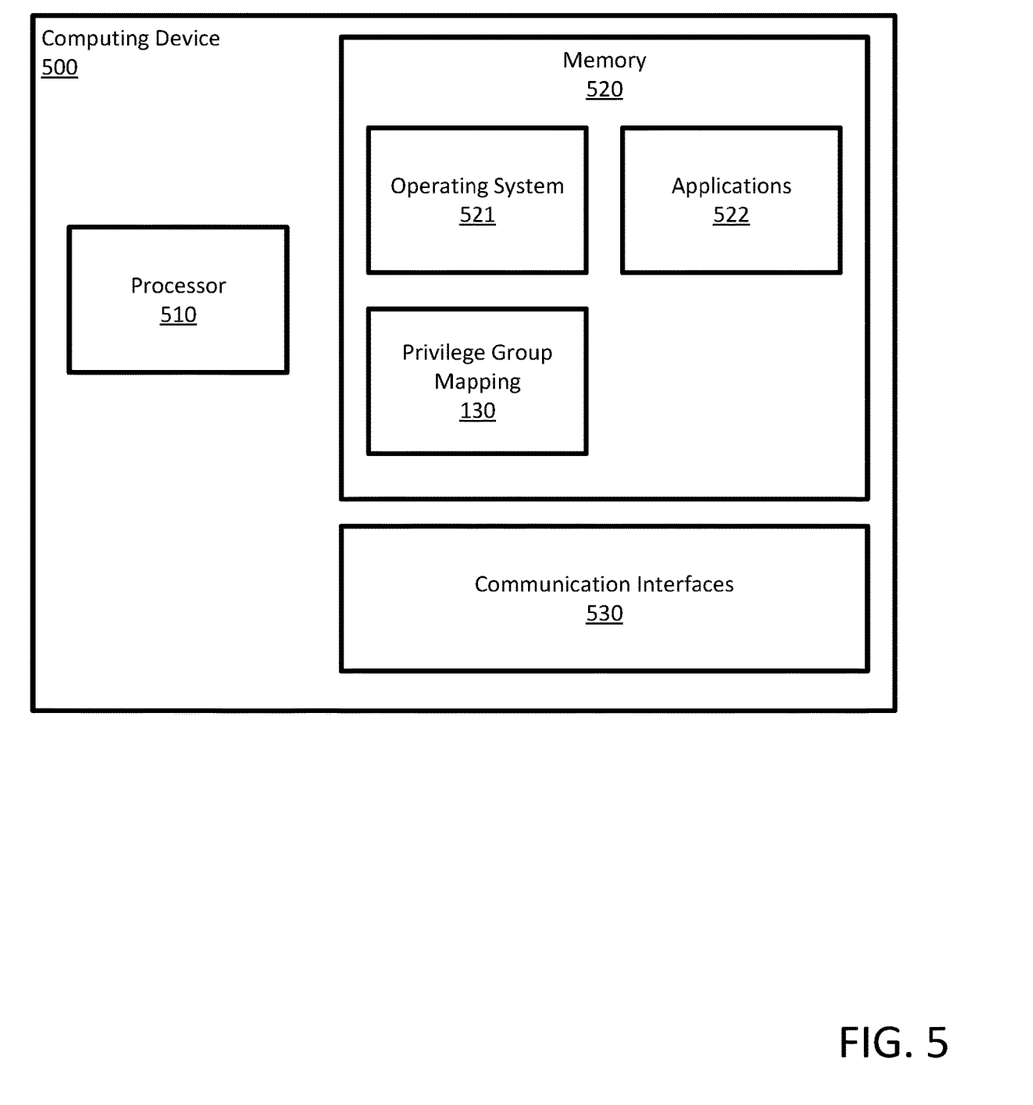
FIG. 5 illustrates hardware of a computing device, according to embodiments of the present disclosure.

FIG. 5 illustrates hardware of a computing device 500, as may be used in an AP 110, client device 120, or network controller 140 described in the present disclosure. The computing device 500 includes a processor 510, a memory 520, and communication interfaces 530. The processor 510 may be any processing element capable of performing the functions described herein. The processor 510 represents a single processor, multiple processors, a processor with multiple cores, and combinations thereof. The communication interfaces 530 facilitate communications between the computing device 500 and other devices. The communications interfaces 530 are representative of wireless communications antennas and various wired communication ports. The memory 520 may be either volatile or non-volatile memory and may include RAM, flash, cache, disk drives, and other computer readable memory storage devices. Although shown as a single entity, the memory 520 may be divided into different memory storage elements such as RAM and one or more hard disk drives.

As shown, the memory 520 includes various instructions that are executable by the processor 510 to provide an operating system 521 to manage various functions of the computing device 500 and one or more applications 522 to provide various functionalities to users of the computing device 500, which include one or more of the functions and functionalities described in the present disclosure. Additionally, the memory 520 includes one or more privilege group mappings 130 to analyze how to format traffic for transmission between client devices 120 and APs 110.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF (Radio Frequency), etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
  receiving, at a client device, a first privilege group mapping from a first Access Point (AP) that identifies first privilege levels for one or more applications executing on the client device;
  receiving, at the client device, a second privilege group mapping from a second AP that identifies second privilege levels for the one or more applications;
  selecting between the first AP and the second AP based on which of the first privilege group mapping and the second privilege group mapping better satisfies requirements of the one or more applications;
  establishing a connection with the selected AP;
  applying Quality of Service (QoS) markers to traffic transmitted from the client device to the selected AP based on the privilege group mapping corresponding to the selected AP; and
  reconfiguring, by the client device in response to receiving the first privilege group mapping, traffic sent from the client device to the first AP according to the privilege group mapping to select a higher QoS category to apply to the traffic.

2. The method of claim 1, further comprising:
  in response to identifying that a given privilege level mapped for a given application is below a desired QoS level, identifying a new AP that offers the desired QoS level;
  disassociated from the first AP; and
  establishing a new connection with the new AP.

3. The method of claim 1, wherein the first privilege group mapping is received before the client device associates with the first AP and the second privilege group mapping is received while the client device is not associated with the second AP.

4. The method of claim 1, wherein the second privilege group mapping is received while the client device is associated with the second AP and replaces an earlier-provided privilege group mapping from the second AP.

5. The method of claim 1, wherein the first privilege group mapping identifies a guaranteed bit rate for a given application.

6. The method of claim 1, wherein an Operating System of the client device replaces original QoS markers applied by the application to the traffic with the QoS markers based on the privilege group mapping.

7. The method of claim 1, wherein the client device applies a first QoS marker to a first packet type and second QoS marker to a second packet type from a single application.

8. A method, comprising:
  mapping, by an Access Point (AP), a plurality of applications to a set of privilege groups for Quality of Service (QoS) levels in a network;
  transmitting the mapping of the privilege groups to a client device, wherein the mapping of the privilege groups enables the client device to reconfigure traffic sent to the AP to apply a higher QoS level to the traffic;
  receiving packets from the client device including QoS markers; and
  in response to determining that the QoS markers received from the client device do not match the privilege groups for the packets, performing a corrective action on the client device.

9. The method of claim 8, wherein the corrective action includes one or more of:
  disassociating the client device from the network; and
  retransmitting the set of privilege groups to the client device.

10. The method of claim 8, wherein the packets include a first flow of data assigned a first QoS marker and a second flow of data assigned a second QoS marker, wherein the QoS markers are determined to not match the privilege groups for the packets when one or more of the first QoS marker and the second QoS marker do not match the privilege groups for the first flow or the second flow respectively.

11. The method of claim 8, further comprising:
  sending downlink traffic to the client device indicated with the QoS markers according to an assigned privilege group for a receiving application running on the client device.

12. The method of claim 8, wherein the set of privilege groups is transmitted before the client device is associated with the AP.

13. The method of claim 8, wherein the set of privilege groups is transmitted to the client device after the client device is associated with the AP and replaces an earlier version of the set of privilege groups.

14. The method of claim 8, further comprising:
  in response to a change in network conditions, re-mapping the plurality of applications to the set of privilege groups based on the change to the network conditions.

15. The method of claim 8, further comprising:
  in response to identifying a new application requesting resources over the network, negotiating a privilege group to assign to the new application based on network settings and connectivity requirements of the new application.

16. A non-transitory computer readable storage device including instructions that when executed by a processor perform an operation comprising:
   mapping, by an Access Point (AP), a plurality of applications to a set of privilege groups for Quality of Service (QoS) levels in a network;
   transmitting the mapping of the privilege groups to a client device, wherein the mapping of the privilege groups enables the client device to reconfigure traffic sent to the AP to apply a higher QoS level to the traffic;
   receiving packets from the client device including QoS markers; and
   in response to determining that the QoS markers received from the client device do not match the privilege groups for the packets, disassociating the client device from the network.

17. The non-transitory computer readable storage device of claim 16, wherein the packets include a first flow of data assigned a first QoS marker and a second flow of data assigned a second QoS marker, wherein the QoS markers are determined to not match the privilege groups for the packets when one or more of the first QoS marker and the second QoS marker do not match the privilege groups for the first flow or the second flow respectively.

18. The non-transitory computer readable storage device of claim 16, wherein the privilege groups are transmitted before the client device is associated with the AP.

19. The non-transitory computer readable storage device of claim 16, wherein the privilege groups are transmitted to the client device after the client device is associated with the AP and replace an earlier version of the privilege groups.

* * * * *